United States Patent
Fukue et al.

[11] Patent Number: 6,065,282
[45] Date of Patent: May 23, 2000

[54] SYSTEM FOR COOLING BLADES IN A GAS TURBINE

[75] Inventors: Ichiro Fukue; Eiji Akita; Yasuoki Tomita, all of Hyogo-ken, Japan

[73] Assignee: Mitsubishi Heavy Industries, Ltd., Tokyo, Japan

[21] Appl. No.: 08/960,466

[22] Filed: Oct. 29, 1997

[51] Int. Cl.[7] ............................. F02G 3/00; F02C 5/00
[52] U.S. Cl. ................ 60/39.182; 60/39.75; 415/115; 415/117
[58] Field of Search ................ 60/39.75, 39.07, 60/39.182; 415/115, 117, 178; 416/95, 96 R

[56] References Cited

U.S. PATENT DOCUMENTS

| | | | |
|---|---|---|---|
| 4,991,394 | 2/1991 | Wright | 60/39.75 |
| 5,340,274 | 8/1994 | Cunha | 415/115 |
| 5,611,197 | 3/1997 | Bunker | 60/36.75 |
| 5,685,158 | 11/1997 | Lenahan et al. | 416/95 |
| 5,685,693 | 11/1997 | Sexton et al. | 415/173.1 |
| 5,697,208 | 12/1997 | Glezer et al. | 60/39.75 |
| 5,782,076 | 7/1998 | Huber et al. | 60/39.75 |
| 5,865,598 | 2/1999 | Twerdochlib | 415/178 |

FOREIGN PATENT DOCUMENTS

| | | |
|---|---|---|
| 08284687 | 10/1996 | Japan . |
| 09060531 | 3/1997 | Japan . |

*Primary Examiner*—Ted Kim
*Attorney, Agent, or Firm*—Alston & Bird LLP

[57] ABSTRACT

A gas turbine comprises: a first closed circuit in which cooling gas is supplied to a casing, allowed to pass through stationary blades, and removed to the outside of casing after cooling the stationary blades; a second closed circuit in which cooling air is supplied to the casing, allowed to pass through moving blades, and removed to the outside of casing after cooling the moving blades; a cooler for cooling the cooling gas in the first and second closed circuits; and a booster for pressurizing and circulating the cooling gas cooled by the cooler.

Also, A gas turbine comprises: a first closed circuit in which cooling air cooled after being extracted from a combustor plenum is allowed to pass through stationary blades successively to cool the stationary blades, and then recovered and returned to a compressor on the upstream side of the combustor plenum; and a second closed circuit in which cooling air cooled after being extracted from the combustor plenum is allowed to pass through moving blades successively to cool the moving blades, and then recovered and returned to the compressor.

2 Claims, 4 Drawing Sheets

6,065,282

SYSTEM FOR COOLING BLADES IN A GAS TURBINE

FIELD OF THE INVENTION AND RELATED ART STATEMENT

The present invention relates to a gas turbine used for a combined cycle.

Conventionally, part of compressed air in a compressor is used to cool gas turbine blades. In this case, compressed air is allowed to flow in a cooling air passage formed in a moving blade and stationary blade to cool a blade head and blade side, and then allowed to flow to the outside of blade to join with the main gas flow of gas turbine, or a semi-closed circuit is formed in which after being drawn from an intermediate casing of compressor to the outside of the casing and cooled by a cooler, the air for cooling the moving and stationary blades cools the moving and stationary blades via a booster pump, and is returned again into a discharge casing. Alternatively, a completely closed circuit is formed for steam cooling, in which air is not used to reduce the quantity of air for cooling the moving and stationary blades, and the steam of a steam turbine is allowed to directly pass through the moving and stationary blades to cool them.

In the case where after cooling the moving and stationary blades of gas turbine, the cooling air is allowed to flow to the outside of blade to join with the main gas flow, as before, the cooling air cannot be recovered at all, and the entire quantity thereof is consumed. This consumed quantity accounts for about 20% of the quantity of compressed air, so that the capacity of compressor is necessarily increased.

Also, in the case where the air for cooling the moving and stationary blades is drawn to the outside of casing, cooled and pressurized via the booster pump, and returned again to the casing, the returned cooling air is released again to the outside of casing because a completely closed circuit is not formed, so that the moving and stationary blades are not always cooled effectively, presenting a problem of reduced cooling effect. Actually, the cooling air joins with the main gas flow and the consumption of part of the cooling air cannot be avoided.

Also, in the case where the closed circuit in which the steam is allowed to directly pass through the moving and stationary blades is formed to effect steam cooling, many problems of oxidation caused by steam, purge of steam remaining in the cooling flow passage, leakage of high-pressure steam, and the like arise.

OBJECT AND SUMMARY OF THE INVENTION

The present invention was made to solve the above problems.

Accordingly, a first object of the present invention is to provide a gas turbine in which cooling air can cool moving and stationary blades by only circulating in a closed circuit without being consumed, so that the capacity of a compressor etc. for supplying the cooling air can be decreased, and the thermal efficiency and performance in a combined cycle incorporating the gas turbine can be improved.

Also, a second object of the present invention is to provide an improved gas turbine in which cooling air can cool gas turbine blades by circulating in a completely closed circuit without being consumed, and the cooling effect of gas turbine blade can further be increased without waste.

To achieve the above first object, the gas turbine in accordance with the present invention comprises: a first closed circuit in which cooling gas is supplied to a casing, allowed to pass through stationary blades, and removed to the outside of casing after cooling the stationary blades; a second closed circuit in which cooling air is supplied to a casing, allowed to pass through moving blades, and removed to the outside of casing after cooling the moving blades; a cooler for cooling the cooling gas in the first and second closed circuits; and a booster for pressurizing and circulating the cooling gas cooled by the cooler.

Specifically, in the gas turbine in accordance with the present invention, the cooling gas in the first closed circuit in which cooling gas is supplied to the casing, allowed to pass through the stationary blades, and removed to the outside of casing after cooling the stationary blades and the second closed circuit in which cooling air is supplied to the casing, allowed to pass through the moving blades, and removed to the outside of casing after cooling the moving blades is cooled by the cooler, and the cooled cooling gas is pressurized and circulated by the booster. Therefore, the cooling gas cools the moving and stationary blades by only circulating in the closed circuits without being consumed.

Also, to achieve the above first object, the gas turbine in accordance with the present invention comprises: a first closed circuit in which cooling gas is supplied to a casing, allowed to pass through stationary blades, and removed to the outside of casing after cooling the stationary blades; a second closed circuit in which cooling air is supplied to a casing, allowed to pass through moving blades, and removed to the outside of casing after cooling the moving blades; a cooler for cooling the cooling gas in the first and second closed circuits; and a booster for pressurizing and circulating the cooling gas cooled by the cooler, and the gas turbine is incorporated in a combined plant with a steam turbine, so that the steam from the steam turbine is supplied to the cooler as a cooling medium.

Specifically, in the gas turbine in accordance with the present invention, the cooling gas flowing in the first closed circuit in which cooling gas is supplied to the casing, allowed to pass through the stationary blades, and removed to the outside of casing after cooling the stationary blades and the second closed circuit in which cooling air is supplied to the casing, allowed to pass through the moving blades, and removed to the outside of casing after cooling the moving blades is cooled by the cooler, and the cooled cooling gas is pressurized and circulated by the booster, and also the gas turbine is incorporated in a combined plant with a steam turbine, so that the steam from the steam turbine is supplied to the cooler as a cooling medium. Therefore, the cooling gas cools the moving and stationary blades by only circulating in the closed circuits without being consumed. Also, the thermal efficiency and performance in the combined cycle incorporating the gas turbine is improved.

Also, to achieve the above second object, the gas turbine in accordance with the present invention comprises: a first closed circuit in which cooling air cooled after being extracted from a combustor plenum is allowed to pass through stationary blades successively to cool the stationary blades, and then recovered and returned to the combustor plenum; and a second closed circuit in which cooling air cooled after being extracted from the combustor plenum is allowed to pass through moving blades successively to cool the moving blades, and then recovered and returned to the combustor plenum.

Specifically, in the gas turbine in accordance with the present invention, the cooling air cooled after being extracted from the combustor plenum is allowed to successively pass through the stationary blades, which constitutes a part of the first closed circuit, to cool the stationary blades, and recovered and returned to the combustor plenum, and also the cooling air cooled after being extracted from the combustor plenum is allowed to successively pass through the moving blades, which constitutes a part of the second closed circuit, to cool the moving blades, and recovered and returned to the combustor plenum. Therefore, the cooling effect of gas turbine blade is improved because the cooling air is extracted from the combustor plenum and returned to the combustor plenum, and the cooling air is not consumed at all because the cooling air is only circulated and all of the cooling air is recovered after cooling the blades. Also, it is unnecessary to make up the cooling medium in the closed circuit.

Also, to achieve the above second object, the gas turbine in accordance with the present invention comprises: a first closed circuit in which cooling air cooled after being extracted from a combustor plenum is allowed to pass through stationary blades successively to cool the stationary blades, and then recovered and returned to a compressor on the upstream side of the combustor plenum; and a second closed circuit in which cooling air cooled after being extracted from the combustor plenum is allowed to pass through moving blades successively to cool the moving blades, and then recovered and returned to the compressor.

Specifically, in the gas turbine in accordance with the present invention, the cooling air cooled after being extracted from the combustor plenum is allowed to successively pass through the stationary blades, which constitutes a part of the first closed circuit, to cool the stationary blades, and recovered and returned to the compressor on the upstream side of the combustor plenum, and also the cooling air cooled after being extracted from the combustor plenum is allowed to successively pass through the moving blades, which constitutes a part of the second closed circuit, to cool the moving blades, and recovered and returned to the compressor. Therefore, the cooling effect of gas turbine blade is improved because the cooling air is extracted from the combustor plenum and returned to the compressor on the upstream of the combustor plenum, and the cooling air is not consumed at all because the cooling air is only circulated and all of the cooling air is recovered after cooling the blades. Also, it is unnecessary to make up the cooling medium in the closed circuit.

DETAILED DESCRIPTION OF PREFERRED EMBODIMENTS

Figure 1:
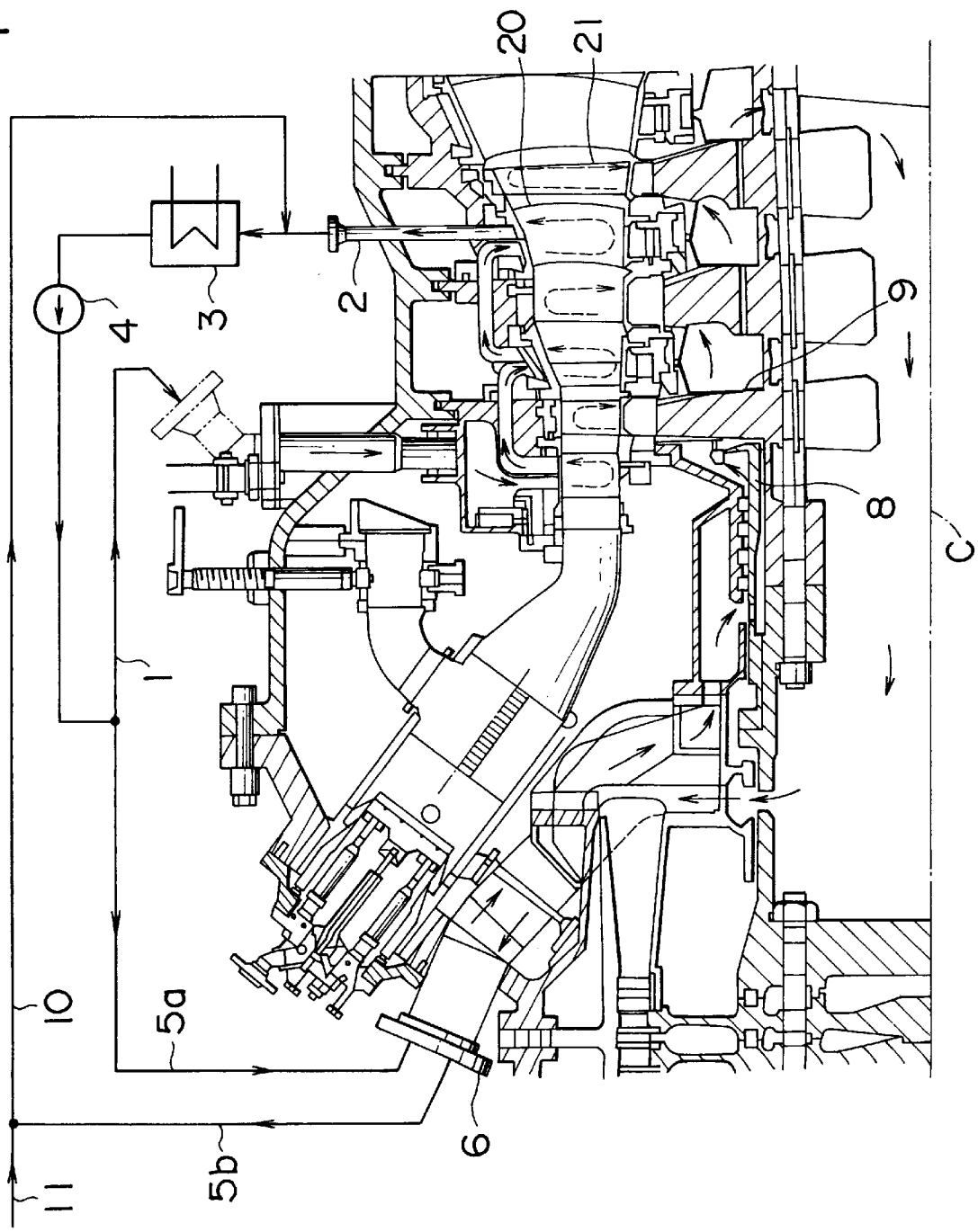
FIG. 1 is a schematic diagram of cooling air in gas turbine blades in accordance with one embodiment of the present invention.
Figure 2:
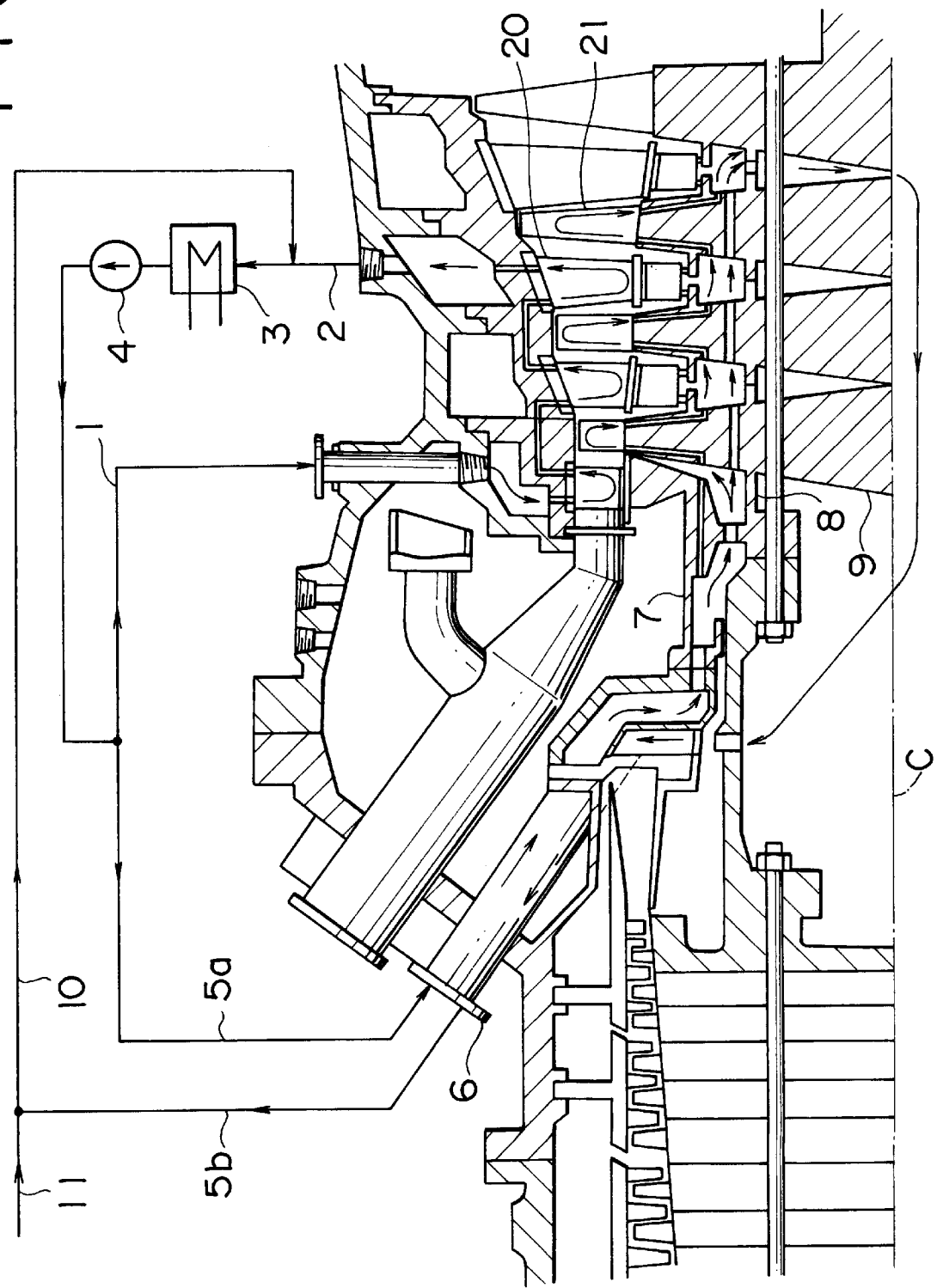
FIG. 2 is a sectional view schematically showing gas turbine blades shown in FIG. 1.

FIGS. 1 and 2 are views for illustrating gas turbine blades in accordance with one embodiment of the present invention. In these figures, the gas turbine blades in accordance with this embodiment are moving and stationary blades of gas turbine used for a combined cycle. The gas turbine having these blades is used for a combined cycle in which a gas turbine facility and a steam turbine facility are combined. As shown in FIGS. 1 and 2, in this embodiment, a construction is used in which cooling air is circulated by passing through the moving and stationary blades to cool these gas turbine blades. Specifically, a passage of the cooling air is connected to a closed circuit, and this closed circuit is provided with an air cooler 3 and a booster pump 4. In FIGS. 1 and 2, reference numeral 1 denotes a pipe for supplying the cooling air for stationary blades 20 into a gas turbine casing, 2 denotes a pipe for removing the cooling air which has cooled the stationary blades 20 to the outside of casing, 5*a* denotes a pipe for introducing the cooling air for moving blades 21 into the casing, 5*b* denotes a pipe for removing the cooling air for the moving blades 21 to the outside of the casing, 6 denotes a dual pipe having two pipes connected to these pipes 5*a* and 5*b*, 7 denotes an intermediate shaft cover of the gas turbine, 8 denotes an air separator, 9 denotes a disk, 10 denotes a pipe for putting the cooling air, which passes through the inside diameter of the disk 9 and one pipe 5*b* of the dual pipe 6 after cooling the moving blade 21 and is introduced to the outside of casing, into the air cooler 3, and 11 denotes a makeup line for making up cooling air from the intermediate stage or final stage of this gas turbine. Also, in FIGS. 1 and 2, reference character C denotes a centerline of rotating shaft for the moving blades 21.

The cooling air for cooling the stationary blades 20 is supplied into the gas turbine casing through the cooling air pipe 1, passes through the stationary blades 20 of first, second, and third stages in the arrow-marked direction to cool the stationary blades 20 successively, and then removed to the outside of casing through the pipe 2. The high-temperature cooling air removed to the outside of casing is introduced into the air cooler 3 where the cooling air is cooled by relatively low-temperature steam supplied from the steam turbine facility in the combined cycle, or by other fluid such as air, water, or sea water. Thereafter, the cooling air is pressurized by the booster pump 4 and circulated again in the casing.

The cooling air for cooling the moving blades 21 is introduced into the casing in the arrow-marked direction through the pipe 5*a* and one pipe of the dual pipe 6, goes into the intermediate shaft cover 7, passes between the intermediate shaft cover 7 and the air separator 8, and enters the moving blades 21 through a small hole of the disk 9 to cool the moving blades 21. The cooling air which has cooled the moving blade 21 goes out through the small hole of the disk 9 again, and successively passes through the moving blades of subsequent stages to cool these moving blades. Thereafter, the cooling air passes through the inside diameter of the disk 9 in the arrow-marked direction, being introduced to the outside of casing by passing through the other pipe 5*b* of the dual pipe 6, and then enters the air cooler 3 through a pipe 10, where it is cooled. The cooled air is pressurized by the booster pump 4, and is supplied to the pipes 1 and 5*a*. Thereafter, the air is recirculated to the stationary blades 20 and moving blades 21.

Thus, the flow of the cooling air circulates in the completely closed circuit to cool the stationary blades 20 and moving blades 21, so that the cooling air is not consumed. Therefore, it is only necessary to replenish cooling air from the makeup line 11 at the makeup time. To the makeup line 11, compressed air is supplied and replenished as cooling air from the intermediate stage or final stage of compressor.

Conventionally, after cooling the moving and stationary blades of gas turbine, the cooling air is allowed to flow to the outside of blade to Join with the main gas flow. In this case, no cooling air is recovered, and the entire quantity thereof is consumed. The consumed quantity accounts for as much as 20% of the quantity of compressed air, so that the capacity of compressor is increased. Also, in the case where the air for cooling the moving and stationary blades is drawn to the outside of casing, cooled and pressurized via the booster pump, and returned again to the casing, the returned cooling air is released again to the outside of casing because a completely closed circuit is not formed, so that the moving and stationary blades are not always cooled effectively, presenting a problem of reduced cooling effect. Actually, the cooling air joins with the main gas flow and the consumption of part of the cooling air cannot be avoided. Also, in the case where the closed circuit in which the steam is allowed to directly pass through the moving and stationary blades is formed to effect steam cooling, many problems of oxidation caused by steam, purge of steam remaining in the cooling flow passage, leakage of high-pressure steam, and the like arise. Contrarily, in the gas turbine blades of this embodiment, in order to overcome these drawbacks, the passage of cooling air in the moving and stationary blades does not communicate with the outside of the blades and is formed so that the cooling air circulates in the blades. This passage is configured into a closed circuit for effecting supply and recovery of cooling air to cool the moving and stationary blades. This closed circuit is provided with the air cooler 3 which uses steam or other fluids as a cooling medium, booster pump 4, and the like. By this configuration, according to the gas turbine blades of this embodiment, the cooling air cools the moving and stationary blades without being consumed because it circulates in the completely closed circuit, so that the cooling method due to air cooling is used as it is. Also, many problems including oxidation, which arise in the case where steam is allowed to pass through the moving and stationary blades to cool them, are not caused. Also, the problem of reduced cooling effect in the semi-closed circuit and the problem of consumption of part of cooling air are eliminated. Further, the thermal efficiency and performance in the combined cycle are improved because the cooling air is only circulated in the closed circuit without being consumed.

As described above, the gas turbine of this embodiment is configured so that the cooling gas in the first closed circuit, in which the cooling gas is supplied into the casing, allowed to pass through the stationary blades to cool them, and removed to the outside of casing, and in the second closed circuit, in which the cooling gas is supplied into the casing, allowed to pass through the moving blades to cool them, and removed to the outside of casing, is cooled by the cooler, the cooled cooling air is pressurized by the booster and circulated, and the steam from a steam turbine, which is incorporated in the combined plant with the steam turbine, is supplied to the cooler as a cooling medium. Therefore, since the cooling gas cools the moving and stationary blades by only circulating in the closed circuit without being consumed, the capacity of compressor etc. for supplying the cooling gas can be decreased.

Figure 3:
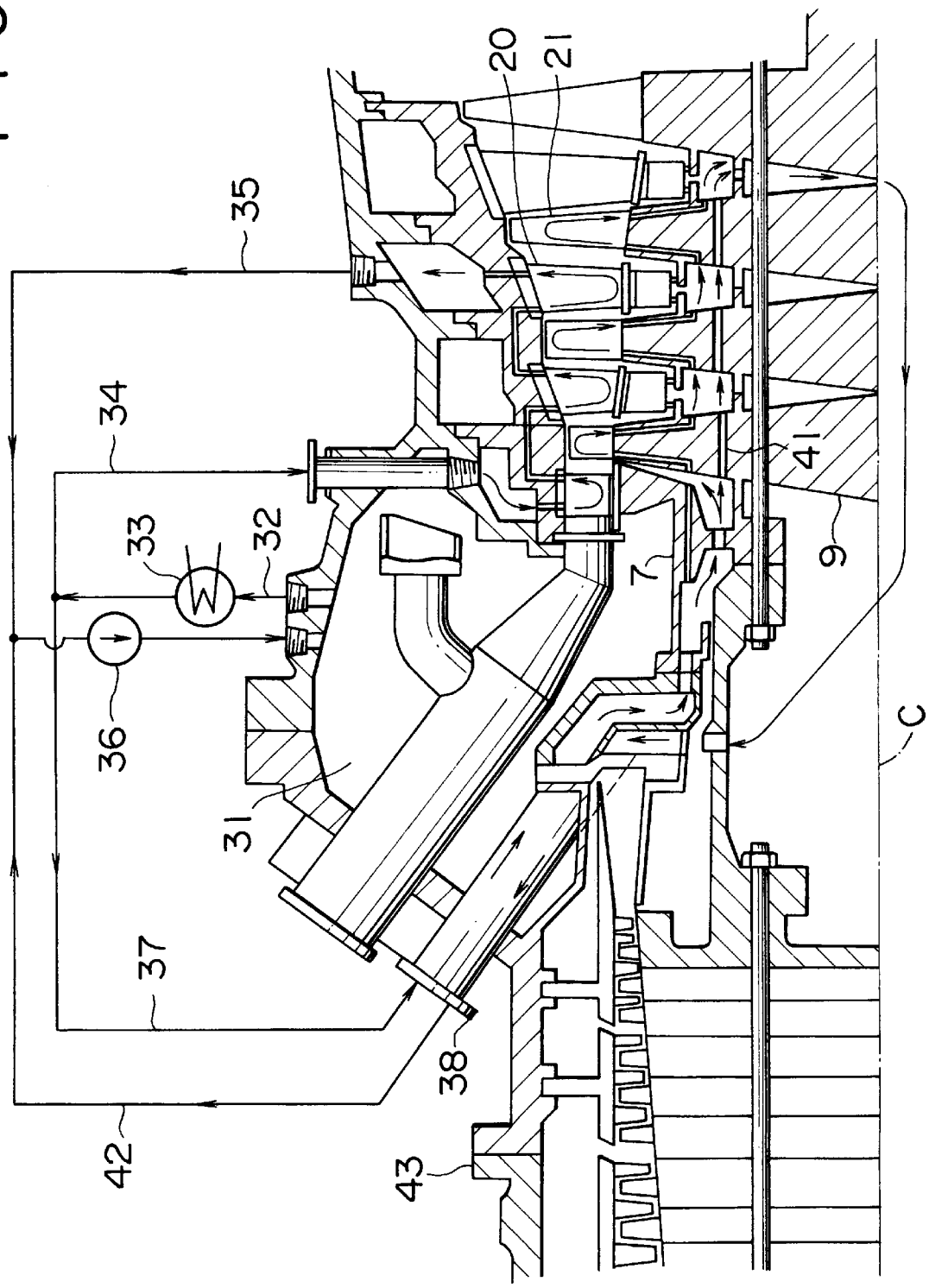
FIG. 3 is a sectional view of gas turbine blades in accordance with another embodiment of the present invention.
Figure 4:
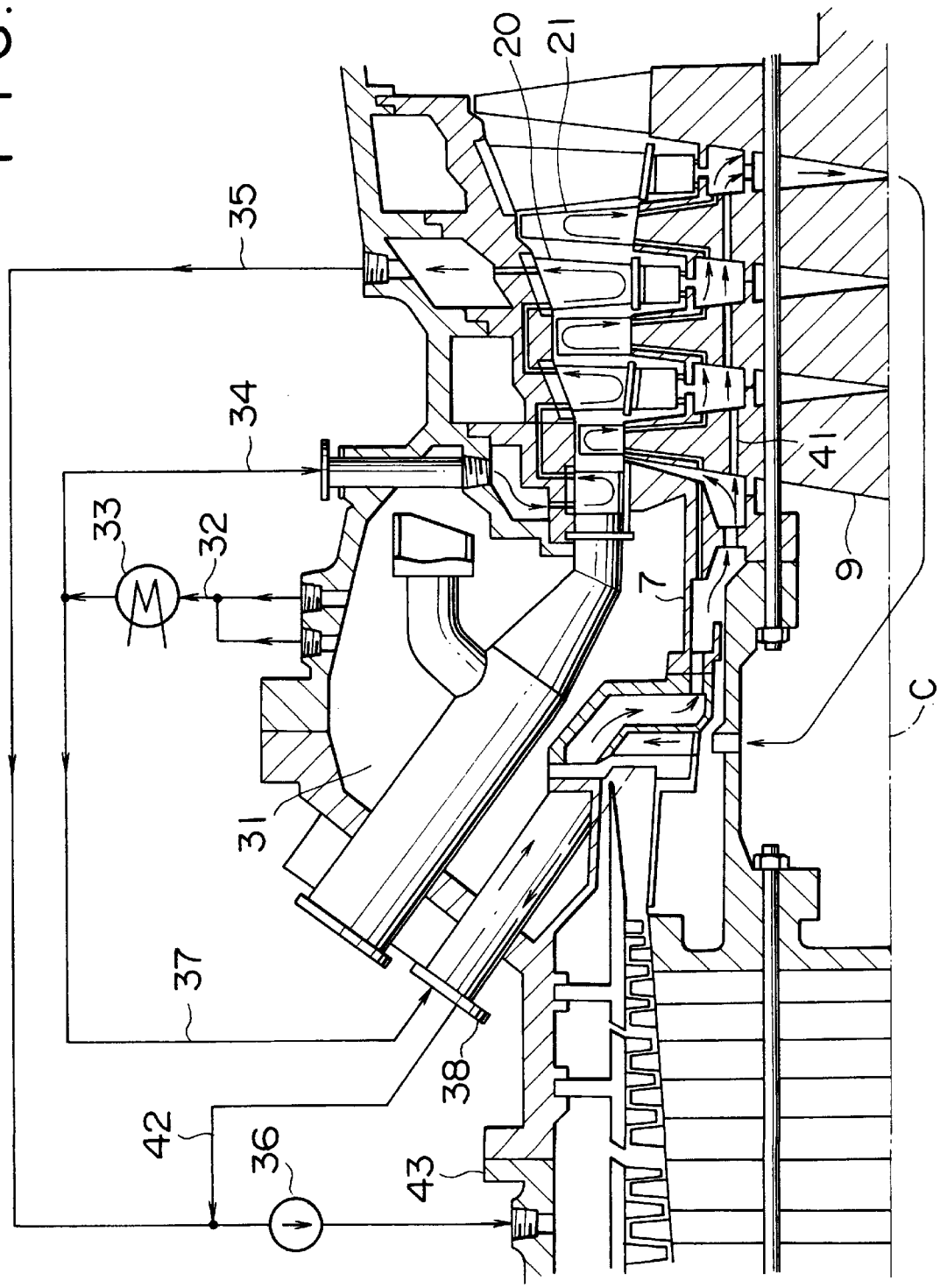
FIG. 4 is a sectional view of gas turbine blades in accordance with still another embodiment of the present invention.

FIG. 3 is a view for illustrating gas turbine blades in accordance with another embodiment of the present invention, and FIG. 4 is a view for illustrating gas turbine blades in accordance with still another embodiment of the present invention. In FIGS. 3 and 4, the same reference numerals are applied to elements which are the same as those shown in FIGS. 1 and 2. In these figures, these gas turbine blades are gas turbine blades in a gas turbine used for a combined cycle, and the cooling air is recovered and circulated after being supplied to cool the interior.

As shown in FIG. 3, in the gas turbine blades in accordance with this embodiment, the cooling air for cooling the moving blades 21 and stationary blades 20 is removed from a combustor plenum 31 to the outside of machine through a cooling air pipe 32, and introduced into an air cooler 33, where the cooling air is cooled by steam or other fluids.

The cooling air for cooling the stationary blades 20 is supplied into the gas turbine casing through a cooling air pipe 34, passes through the stationary blades 20 of first, second, and third stages in the arrow-marked direction to cool the stationary blades 20 successively, and then removed to the outside of casing through a pipe 35. The high-temperature cooling air removed to the outside of casing is pressurized by a booster 36, and then returned again to the combustor plenum 31.

The cooling air for cooling the moving blades 21 is introduced into the casing in the arrow-marked direction through a pipe 37 and one pipe of a dual pipe 38. The cooling air passes through the inside of the intermediate shaft cover 7, and enters the closed circuit in the moving blades 21 through a small hole of the disk 9 to cool the moving blades 21. Part of the cooling air bypasses a disk hole 41 to be used for increasing the cooling effect at the subsequent stages. After cooling, the cooling air passes through the inside diameter of the disk 9, being introduced to the outside of casing by passing through the other pipe of the dual pipe 38, and then passes through a pipe 42 and is pressurized by the booster 36. Thereafter, the cooling air is returned again to the combustor plenum 31.

Thus, in the gas turbine blades of this embodiment, the closed circuit for circulating the passage for cooling air in the moving blades 21 and stationary blades 20 is formed, and the compressed air extracted from the combustor plenum 31 is cooled by using the steam extracted from the steam turbine by the air cooler 33. After the moving blades 21 and stationary blades 20 are cooled by this compressed air, the cooling air which has cooled the blades is pressurized by the booster 36 and returned again to the combustor plenum 31. Therefore, since the cooling air is circulated in the completely closed circuit, all of the cooling air which has cooled the blades is recovered and not consumed. Also, it is unnecessary to make up the cooling medium in the closed circuit. Thereby, the thermal efficiency and performance in the combined cycle are improved.

As shown in FIG. 4, in the gas turbine blades in accordance with this embodiment, the cooling air for cooling the moving blades 21 and stationary blades 20 is removed from a combustor plenum 31 to the outside of machine through a cooling air pipe 32, and introduced into an air cooler 33, where the cooling air is cooled by steam or other fluids.

The cooling air for cooling the stationary blades 20 is supplied into the gas turbine casing through a cooling air pipe 34, passes through the stationary blades 20 of first, second, and third stages in the arrow-marked direction to cool the stationary blades 20 successively, and then removed to the outside of casing through the pipe 35. The high-temperature cooling air removed to the outside of casing is pressurized by the booster 36, and then returned to the intermediate stage of a compressor 43.

The cooling air for cooling the moving blades 21 is introduced into the casing in the arrow-marked direction through a pipe 37 and one pipe of a dual pipe 38. The cooling air passes through the inside of-the intermediate shaft cover 7, and enters the closed circuit in the moving blade 21 through a small hole of the disk 9 to cool the moving blade 21. Part of the cooling air bypasses a disk hole 41 to be used for increasing the cooling effect at the next stage and the next but one stage. After cooling, the cooling air passes through the inside diameter of the disk 9, being introduced to the outside of casing by passing through the other pipe of the dual pipe 38, and then passes through a pipe 42 and is pressurized by the booster 36. Thereafter, the cooling air is returned to the intermediate stage of the compressor 43.

Thus, the process in which the cooling air for the moving blades 21 and stationary blades 20 is removed from the combustor plenum 31 to the outside of machine, being cooled by the air cooler 33, and removed again to the outside of machine after cooling the moving blades 21 and stationary blades 20 is the same as that in the gas turbine blades in accordance with the above-described embodiment. However, in the gas turbine blades of this embodiment, the hot air which is removed to the outside of machine after cooling the moving blades 21 and stationary blades 20 is pressurized by the booster 36, and then returned to the intermediate stage of the compressor 43, where the air is pressurized by the compressor 43, being introduced again to the combustor plenum 31. Therefore, according to the gas turbine blades of this embodiment, the same operation and effect as those of the gas turbine blades of the above-described embodiment can be obtained.

On the other hand, in the gas turbine shown in FIGS. 1 and 2, the gas turbine blades can be cooled without the consumption of cooling air because the cooling air circulates in the completely closed circuit. However, the cooling effect of gas turbine blade must also be increased without waste. Contrarily, in the gas turbine blades shown in FIGS. 3 and 4, the closed circuit for effecting air cooling in the stationary blades 20 and moving blades 21 is formed, so that the cooling air is circulated in this closed circuit to cool the stationary blades 20 and moving blades 21 and recovered and returned to the combustor plenum 31 or the intermediate stage of the compressor 43. Therefore, the cooling air is not consumed at all. As a result, the thermal efficiency and performance in the combined cycle is improved.

The gas turbine in accordance with the present invention is configured so that the cooling air cooled after being extracted from the combustor plenum is allowed to successively pass through the stationary blades, which constitutes a part of the first closed circuit, to cool the stationary blades, and recovered and returned to the combustor plenum or the compressor on the upstream side of the combustor plenum, and also the cooling air cooled after being extracted from the combustor plenum is allowed to successively pass through the moving blades, which constitutes a part of the second closed circuit, to cool the moving blades, and recovered and returned to the combustor plenum or the compressor. Therefore, all of the cooling air is recovered after cooling the blades and returned to the combustor plenum or the compressor without being consumed, so that the thermal efficiency and performance in the combined cycle can be improved.

We claim:

1. A gas turbine comprising: a compressor;

a combustor plenum downstream of said compressor;

stationary and moving blades;

a cooling air cooler;

first and second closed cooling circuits which extract cooling air from said combustor plenum and pass the cooling air through said cooler, the first closed circuit supplying cooling air from said cooler successively through said stationary blades to cool said stationary blades and then recovering the cooling air and returning the cooling air to said compressor, and the second closed circuit supplying cooling air from said cooler successively through said moving blades to cool said moving blades and then recovering the cooling air and returning the cooling air to said compressor; and a booster returning the cooling air received from the stationary and moving blades of said first and second closed circuits to the compressor.

2. The gas turbine of claim 1, further comprising a steam turbine operating in conjunction with the gas turbine to form a combined cycle, steam from said steam turbine being supplied to said air cooler for cooling the cooling air.

* * * * *